United States Patent
Yoshizuka et al.

(10) Patent No.: US 9,870,643 B2
(45) Date of Patent: Jan. 16, 2018

(54) DEVELOPMENT VIEW GENERATION SYSTEM AND NON-TRANSITORY COMPUTER READABLE MEDIUM STORING PROGRAM

(71) Applicant: FUJI XEROX CO., LTD., Tokyo (JP)

(72) Inventors: Masanori Yoshizuka, Kanagawa (JP); Toshihiro Numauchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 73 days.

(21) Appl. No.: 14/881,704

(22) Filed: Oct. 13, 2015

(65) Prior Publication Data

US 2016/0335794 A1    Nov. 17, 2016

(30) Foreign Application Priority Data

May 13, 2015 (JP) ................. 2015-097843

(51) Int. Cl.
 *G06F 17/50*  (2006.01)
 *G06T 19/00*  (2011.01)

(52) U.S. Cl.
 CPC .............. *G06T 19/00* (2013.01); *G06F 17/50* (2013.01); *G06T 2219/021* (2013.01)

(58) Field of Classification Search
 None
 See application file for complete search history.

(56) References Cited

U.S. PATENT DOCUMENTS

| 6,678,568 B1 * | 1/2004 | Yamada | G06T 17/00 700/145 |
| 6,694,199 B1 * | 2/2004 | Yamada | G06T 19/00 700/118 |
| 2012/0197601 A1 * | 8/2012 | Matsui | G06F 17/50 703/1 |

FOREIGN PATENT DOCUMENTS

JP    07-056974 A    3/1995

* cited by examiner

*Primary Examiner* — Edward Martello
(74) *Attorney, Agent, or Firm* — Sughrue Mion, PLLC

(57) ABSTRACT

Provided is a development view generation system including a storage unit that stores information on a three-dimensional shape of an article, a development surface determination unit in which when there is a second surface adjacent to a first surface, the first surface being a determination target, and there is a third surface adjacent to the first surface and the second surface, if an angle between the first surface and the second surface and an angle between the first surface and the third surface are a pre-set threshold or less, the development surface determination unit determines the first surface as a development surface, and if any one of the respective angles is greater than the threshold, the development surface determination unit determines the first surface as a non-development surface, and a development view generation unit that generates a development view, for a surface which is determined as a development surface.

6 Claims, 17 Drawing Sheets

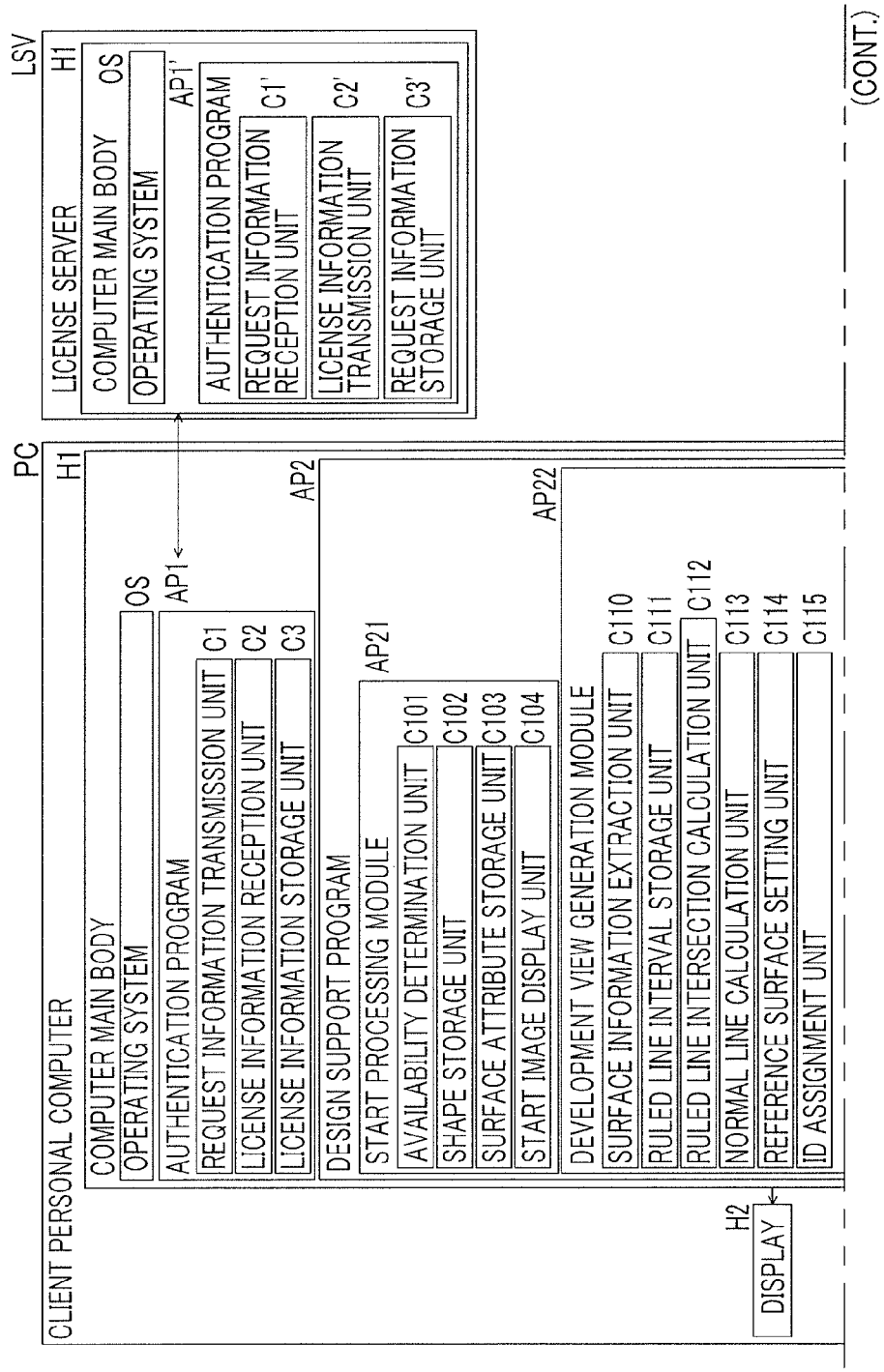

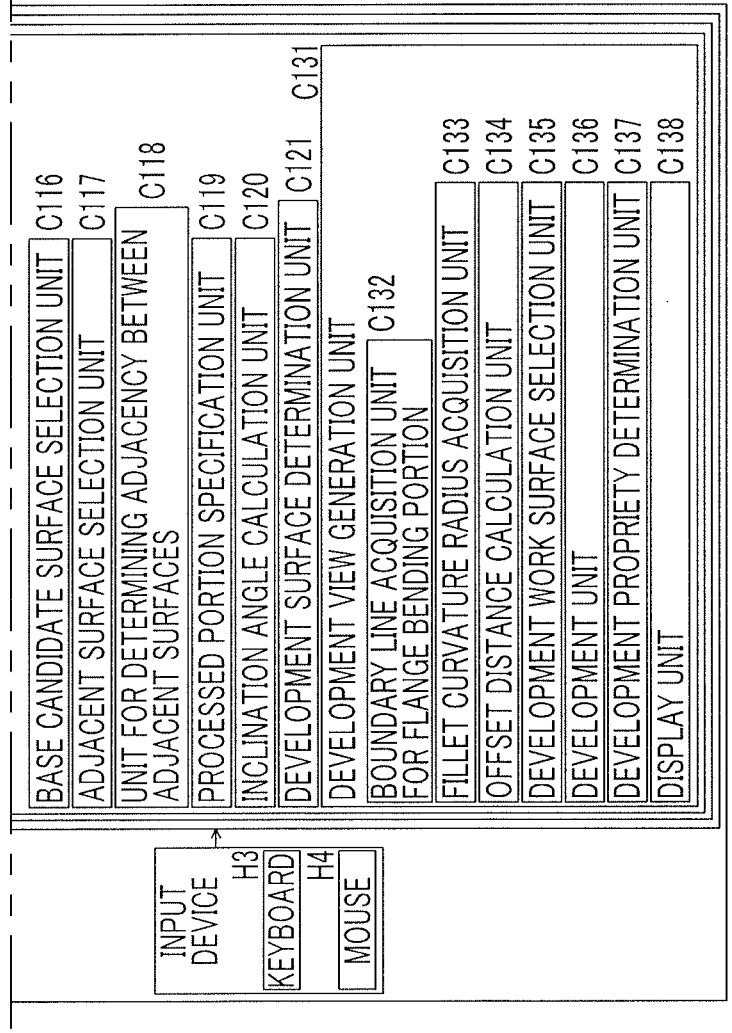
(FIG. 2 Continued)

DEVELOPMENT VIEW GENERATION SYSTEM AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2015-097843 filed May 13, 2015.

BACKGROUND (i) Technical Field

The present invention relates to a development view generation system and a non-transitory computer readable medium storing a program.

(ii) Related Art

In the related art, the design of parts constituting mechanical products and the like has been performed by using a design supporting system such as a three-dimensional computer aided design system.

SUMMARY

According to an aspect of the invention, there is provided a development view generation system including:

a storage unit that stores information on a three-dimensional shape of an article;

a development surface determination unit in which when there is a second surface adjacent to a first surface, the first surface being a determination target, and there is a third surface adjacent to the first surface and the second surface, among surfaces forming the three-dimensional shape of the article, if an angle between the first surface and the second surface is a pre-set threshold or less, and an angle between the first surface and the third surface is the threshold or less, the development surface determination unit determines the first surface as a development surface, and if any one of the respective angles is greater than the threshold, the development surface determination unit determines the first surface as a non-development surface; and a development view generation unit that generates a development view along a pre-set reference surface, for a surface which is determined as a development surface by the development surface determination unit.

BRIEF DESCRIPTION OF THE DRAWINGS

Exemplary embodiments of the present invention will be described in detail based on the following figures, wherein:

FIG. 2 is a diagram illustrating respective functions of controllers of a client personal computer and a license server of the first example, as a functional block diagram;

FIG. 7A is a perspective view of a flange bending portion, FIG. 7B is a sectional view taken along line VIIB-VIIB in FIG. 7A, FIG. 7C is a perspective view of a throttle portion, and FIG. 7D is a sectional view taken along line VIID-VIID in FIG. 7C;

FIG. 8A is an explanatory diagram of a case where an inclination angle is 90° or less, and FIG. 8B is an explanatory diagram of a case where the inclination angle is greater than 90° and less than 180°;

FIG. 9A is an explanatory diagram of a case where the flange bending portions are connected through a fillet surface, and FIG. 9B is an explanatory diagram of a case where the flange bending portions are connected not through the fillet surface;

FIG. 10A is a sectional view taken along line XA-XA in FIG. 9A, and FIG. 10B is a sectional view taken along line XB-XB in FIG. 9B;

FIG. 11A is an entire explanatory diagram, and FIG. 11B is an enlarged view of the flange bending portion;

FIG. 14A is an explanatory diagram of a three-dimensional shape of a development view generation target, FIG. 14B is an explanatory diagram of ID assignment, FIG. 14C is an explanatory diagram when processed portions are specified, and FIG. 14D is an explanatory diagram when the flange bending portion and the throttle portion are specified;

FIG. 15A is an explanatory diagram of a development view generation target, FIG. 15B is an explanatory diagram of a development view in which a first surface is developed, FIG. 15C is an explanatory diagram of a development view in which a subsequent surface is developed, and FIG. 15D is an explanatory diagram of a development view in which a development work has been completed.

DETAILED DESCRIPTION

Figure 1:
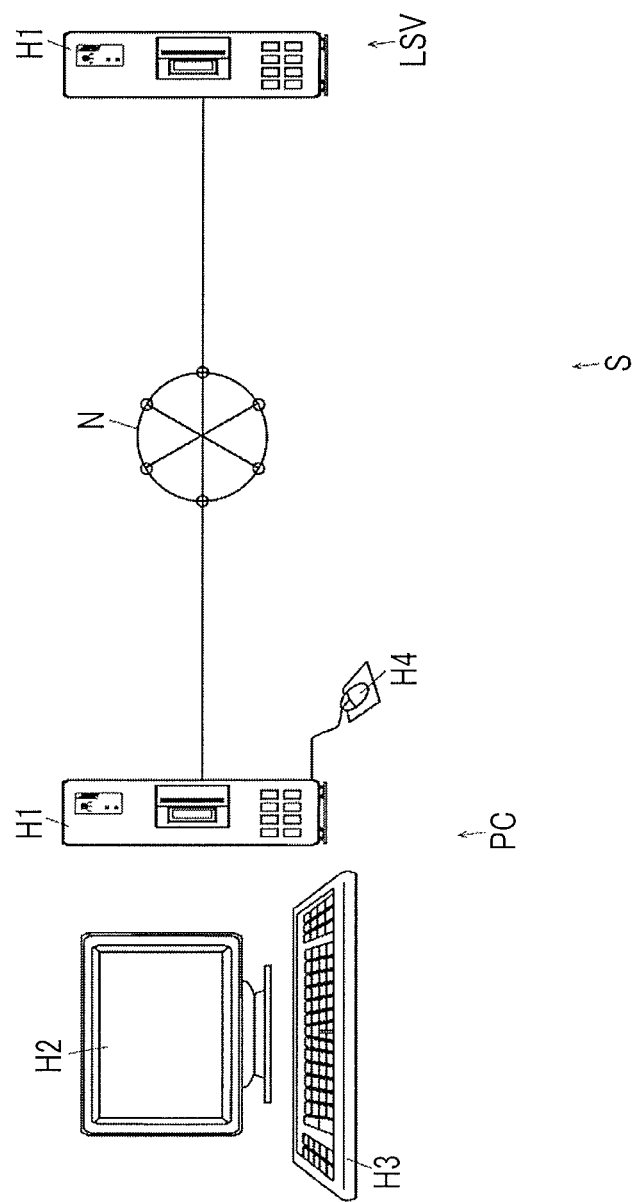
FIG. 1 is an entire explanatory diagram of a design supporting system of a first example of the present invention.

Hereinafter, specific examples of exemplary embodiments of the present invention (hereinafter, referred to as examples) will be described with referring to the drawing, but the present invention is not limited to the following examples.

In addition, in the description using the following drawings, illustration of members other than those necessary for explanation will be appropriately omitted, for ease of understanding.

First Example

FIG. 1 is an entire explanatory diagram of a design supporting system of the first example of the present invention.

In FIG. 1, a design supporting system S of the first example has functions of a development view generation system. The design supporting system S includes a client personal computer PC as an example of a design support apparatus. The client personal computer PC has a function of a development view generation apparatus. The client personal computer PC is connected to a license server LSV as an example of a license device, through a network N as an example of a communication line. The license server LSV gives a license of the design supporting system S to a client personal computer PC that has been regularly registered. The network N of the first example is made of so-called the Internet. Further, the client personal computer PC and the license server LSV of the first example are configured with computer devices as an example of electronic calculators.

The client personal computer PC of the first example includes a computer main body H1 as an example of a calculator body. A display H2 as an example of a display device is connected to the computer main body H1. Further, a keyboard H3 and a mouse H4 as examples of an input device are connected to the computer main body H1. The computer main body H1 has a HD drive as an example of a storage device, not illustrated, in other words, a hard disk drive, or a CD drive as an example of a reading device of a storage medium, in other words, a compact disk drive, and the like. In addition, similarly to the client personal computer PC, the license server LSV of the first example includes the computer main body H1, and a hard disk drive or a CD drive which is not illustrated.

Description of Controller of First Example

FIG. 2 is a diagram illustrating respective functions of the controllers of the client personal computer and the license server of the first example as a functional block diagram.

Description of Controller of Client Personal Computer PC

In FIG. 2, the computer main body H1 of the client personal computer PC includes an I/O, in other words, an input and output interface. The input and output interface performs input and output of signal with the outside and adjustment of input and output signal levels or the like. Further, the computer main body H1 includes a ROM, in other words, a read only memory. The read only memory stores a program, data, and the like for performing necessary processes.

Further, the computer main body H1 includes a RAM, in other words, a random access memory. The random access memory temporarily stores necessary data. Further, the computer main body H1 includes, a CPU, in other words, a central processing unit. The central processing unit performs a process in accordance with a program stored in the hard disk or the like. Further, the computer main body H1 includes a clock oscillator or the like.

The client personal computer PC may realize various functions by executing the program stored in the hard disk, the ROM, or the like. The operating system OS which is basic software is stored in the hard disk of the client personal computer PC.

The operating system OS controls the basic operation of a computer device.

Further, a design support authentication program AP1 is stored in the hard disk of the client personal computer PC. The design support authentication program AP1 acquires information on the license of the design supporting system S from the license server LSV.

Further, a design support program AP2 as an example of a development view generation program is stored in the hard disk of the client personal computer PC. The design support program AP2 includes a start processing module AP21, and a development view generation module AP22. The start processing module AP21 performs a setting process for starting the development view generation module AP22. The development view generation module AP22 performs a development view generation process.

Further, application programs and the like such as word processing software which is document preparation software and software for sending and receiving e-mail, not illustrated, are stored in the hard disk of the client personal computer PC.

Hereinafter, respective functions (control units) of respective programs AP1 and AP2 will be described, except for generally known operating systems OS and not illustrated application programs.

Authentication Program AP1

The authentication program AP1 includes a request information transmission unit C1, a license information reception unit C2, and a license information storage unit C3.

The request information transmission unit C1 transmits request information for requesting the use of the design supporting system S.

The license information reception unit C2 receives license information for indicating license of the use of the design supporting system S.

The license information storage unit C3 stores the license information.

In addition, the client personal computer PC of the first example receives the license of the design supporting system S by transmitting the request information and receiving the license information, with the license server LSV.

Design Support Program AP2

Start Processing Module AP21

C101: Availability Determination Unit

An availability determination unit C101 determines whether or not to allow the use of the design supporting system S, based on the license information of the license information storage unit C3.

In addition, if it is determined that the use is not allowed, the availability determination unit C101 of the first example displays an image (not illustrated) indicating non-permission on the display H2. Then, the availability determination unit C101 ends the design support program AP2.

Figure 3:
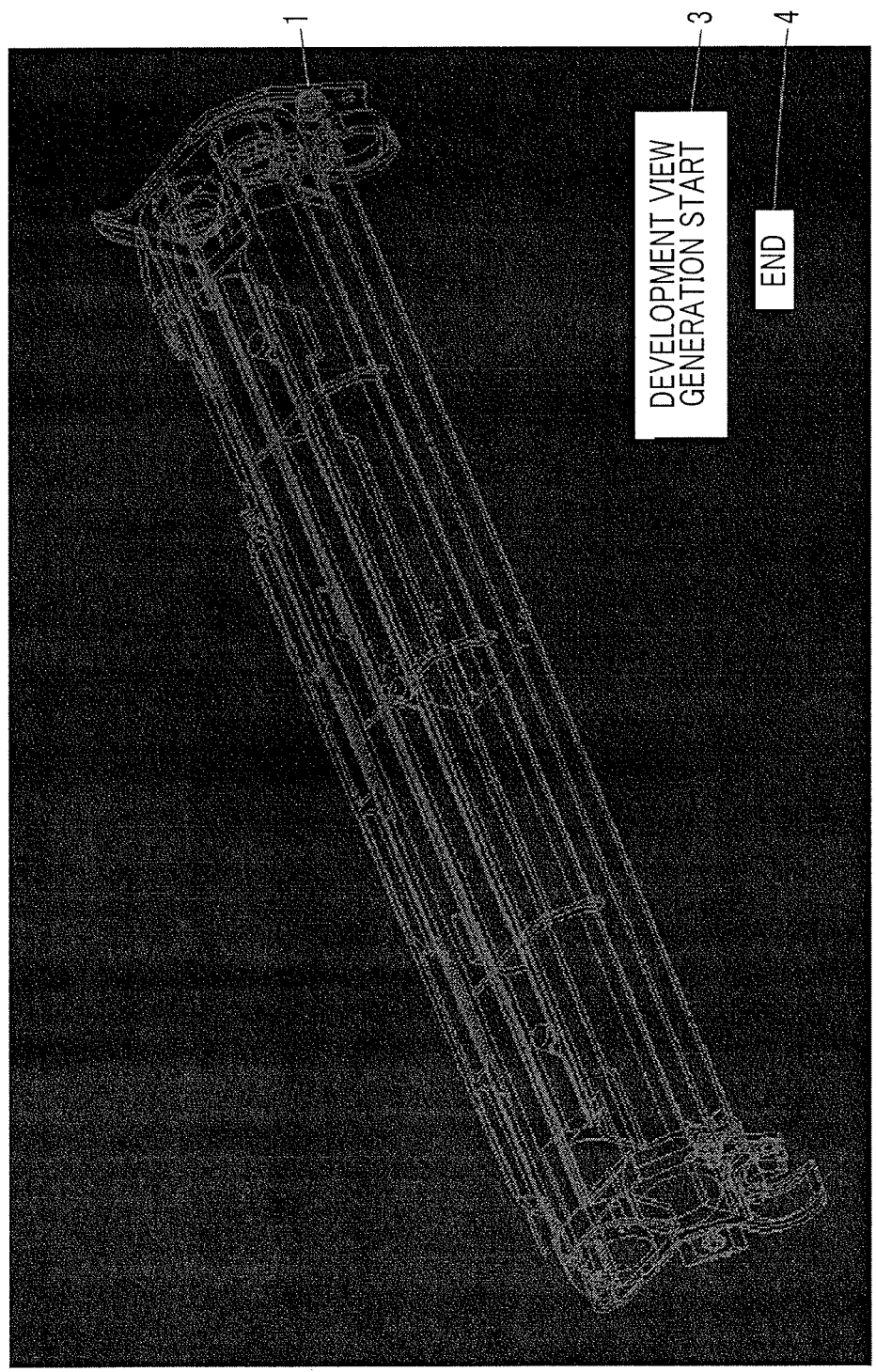
FIG. 3 is an explanatory diagram of an image of an article displayed on a display of the first example.

FIG. 3 is an explanatory diagram of an image of an article displayed on the display in the first example.

In the following drawings, the shapes of articles to be subjected to molding are different depending on the description contents of the drawings, and the shapes are not necessarily the same.

C102: Shape Storage Unit

A shape storage unit C102 stores information on the three-dimensional shape of an article. In addition, the shape storage unit C102 of the first example stores three-dimensional data having surface information, as an example of the information on the three-dimensional shape of an article. Specifically, the shape storage unit C102 of the first example stores, as the surface information, with respect to the surfaces A1, A2, A3, . . . , and An forming an article, the surface areas B1 to Bn of the respective surfaces A1 to An, the shapes and positions of the respective surfaces A1 to An. Further, the shape storage unit C102 of the first example also stores information regarding the inside enclosed by the respective surfaces A1 to An, in other words, information specifying the inside of the article.

C103: Surface Attribute Storage Unit

A surface attribute storage unit C103 stores surface attributes for the surfaces A1, A2, A3, . . . , and An forming an article. The surface attribute storage unit C103 of the first example stores, as an example of the surface attribute, whether or not each of the surfaces A1 to An is a fillet surfaces F as an example of a connecting surface, or an end surface E as an example of a thickness surface. Further, the first example illustrates a configuration in which whether or not each of the surface A1 to An is the fillet surface F or the end surface E is stored in advance as the surface attribute of each of the surfaces A1 to An, but is not limited to the configuration in which the surface attribute is set and stored in advance. For example, a configuration is possible in which whether or not each of the surface A1 to An is the fillet surface F or the end surface E is determined based on the three-dimensional data, and the surface attribute of each of the surfaces A1 to An is obtained, by a configuration known in the related art.

C104: Start Image Display Unit

A start image display unit C104 displays an image 1 which is formed as an image of the article, based on the three-dimensional data of the article, on the display H2. Further, the start image display unit C104 displays an image 3 of a button for the execution start of a development view generation process, on the display H2. Further, the start image display unit C104 of the first example displays an image 4 of a button for the completion of a design support process, on the display H2. FIG. 3 of the first example illustrates the image 1 of a developing container of a developing device of an image forming apparatus as an example of an article, as an example. In addition, if there is an input by the image 3 of button being selected by the keyboard H3 and the mouse H4, the module AP22 corresponding to the selected image is executed. In addition, if there is an input by the image 4 of a button being selected by the keyboard H3 and the mouse H4, the process of the design support program AP2 is completed.

Development View Generation Module AP22

Figure 4:
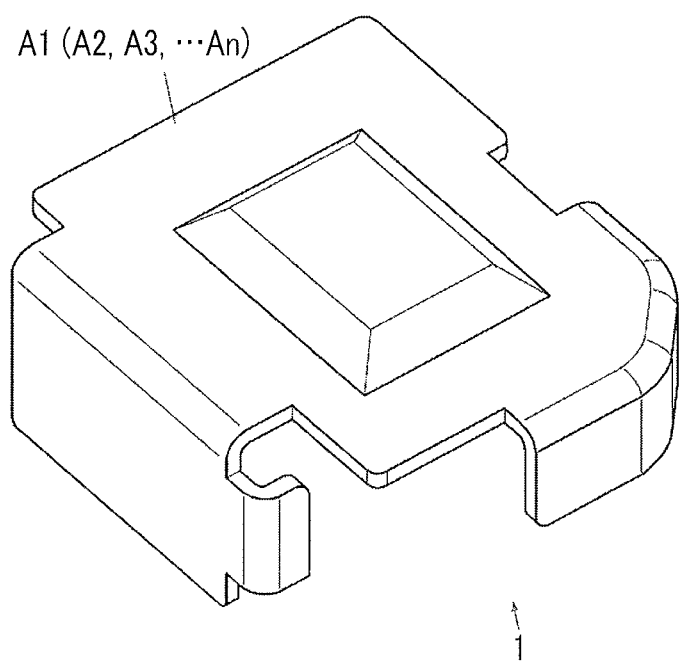
FIG. 4 is an explanatory diagram of an article shape to be developed in the first example.

FIG. 4 is an explanatory diagram of an article shape to be developed in the first example.

C110: Surface Information Extraction Unit

A surface information extraction unit C110 extracts all surfaces A1, A2, A3, . . . , and An forming the shape of the article, based on the three-dimensional data that the shape storage unit C102 stores. Further, information as to whether each of the surfaces A1 to An is the fillet surface F or the end surface E is extracted, based on the storage information stored in the surface attribute storage unit C103.

Figure 5:
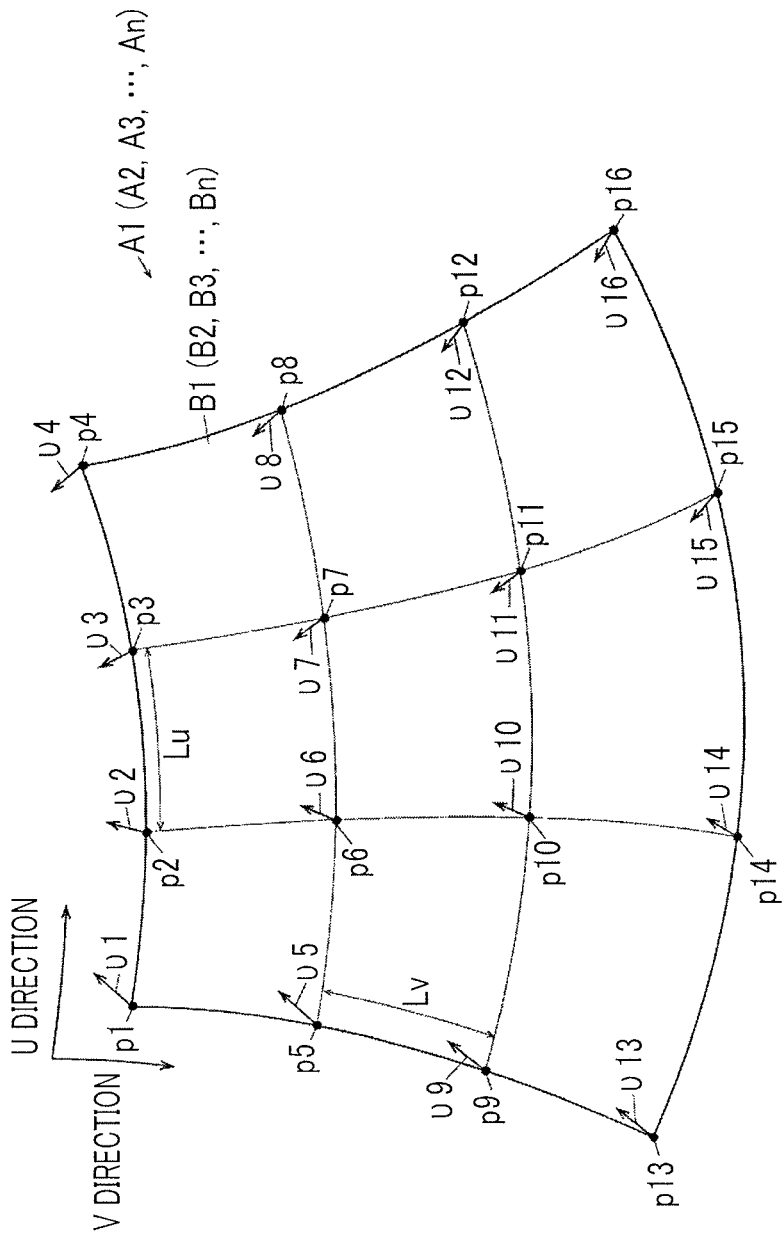
FIG. 5 is an enlarged explanatory diagram of a main part of an image in which grid lines in a u-direction and a v-direction intersecting with each other are represented on the surface of the article.

FIG. 5 is an enlarged explanatory diagram of a main part of an image in which grid lines in a u-direction and a v-direction intersecting with each other are represented on the surface of the article.

C111: Ruled Line Interval Storage Unit

A ruled line interval storage unit C111 stores the pre-set interval Lu in the u-direction and the pre-set interval Lv in the v-direction, in the u-direction and the v-direction intersecting with each other, with respect to grid lines as an example of ruled lines represented on the surfaces A1 to An of the article. In addition, in the first example, pre-set values are used for the interval Lu in the u-direction and the interval Lv in the v-direction, but without being limited thereto, a configuration is possible in which the operator inputs and sets the intervals.

C112: Ruled Line Intersection Calculation Unit

A ruled line intersection calculation unit C112 calculates grid intersections p1, p2, p3, . . . , pj on the respective surfaces A1 to An which are intersections between the grid lines in the u-direction and the grid lines in the v-direction of the respective surfaces A1 to An of the article and the boundary line surrounding the respective surfaces A1 to An of the article, based on the interval Lu in the u-direction and the interval Lv in the v-direction. In addition, FIG. 5 illustrates the case where the total number j of the grid intersections is 16, as an example. The total number j of the grid intersections is automatically set when the grid intersections are calculated, based on the surface areas B1 to Bn of the surfaces A1 to An in which the grid intersections are located and the sizes of the interval Lu in the u-direction and the interval Lv in the v-direction.

C113: Normal Line Calculation Unit

A normal line calculation unit C113 as an example of a unit that obtains a normal line calculates normal line vectors v1 to vj which are example of the normal line, for the points p1 to pj that are set on the surfaces A1 to An. In the first example, the sizes of the normal line vectors v1 to vj are calculated as a unit vector of which size is 1. Further, in this specification, the reference numerals with "v" represent a vector quantity.

Figure 6:
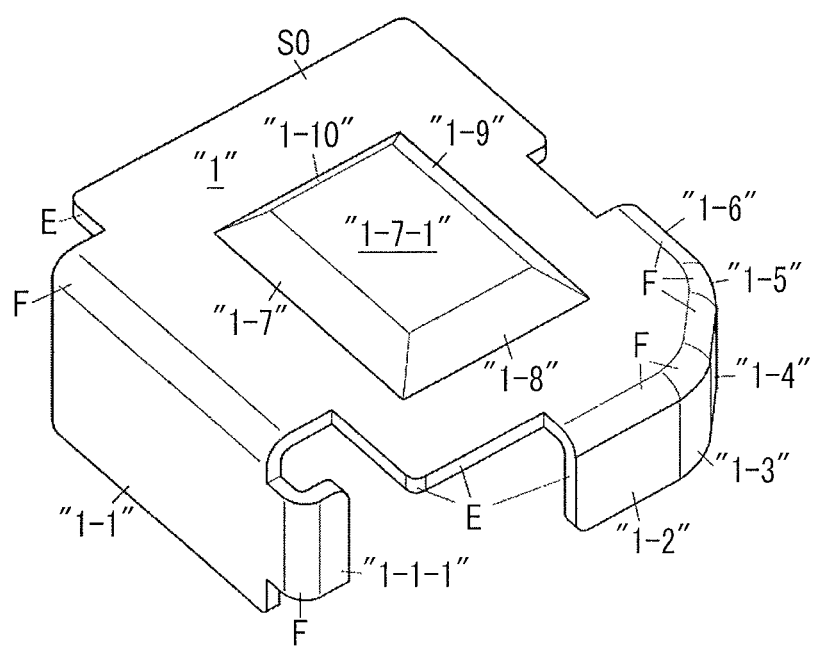
FIG. 6 is an explanatory diagram of IDs assigned to the surfaces of the article shape to be developed in the first example.

FIG. 6 is an explanatory diagram of an IDs assigned to the surfaces of the article shape to be developed in the first example.

C114: Reference Surface Setting Unit

A reference surface setting unit C114 sets a surface with the largest surface area, among the surfaces A1 to An with surface areas B1 to Bn, as a reference surface S0 for development. In addition, in the first example, when there are one or more largest surfaces, the surface with a small subscript of A is set as the reference surface S0.

C115: ID Assignment Unit

An ID assignment unit C115 as an example of a determination target setting unit assigns an ID as an example of identification information, to a surface of a determination target. The ID assignment unit C115 assigns an ID to each of the surfaces A1 to An, excluding the fillet surface F and the end surface E, in order from the reference surface S0. In FIG. 6, in the first example, an ID "1" is granted to the reference surface S0. Then, the ID "1", information indicating adjacency "-", and the identification number "1" . . . are granted to the surfaces which are close to the surface of the ID "1" but are neither the fillet surface F nor the end surface E. In other words, IDs "1-1", "1-2", "1-3", . . . , "1-10" are granted. If granting IDs to the surfaces which are close to the surface of the ID "1" is ended, for the next ID "1-1", information indicating adjacency "-", and the identification number "1" . . . are granted, similar to the case of the ID "1". In other words, an ID "1-1-1" is granted. In the similar manner, this process is repeated until IDs are granted to all of the surfaces excluding the fillet surface F and the end surface E. In addition, in the first example, IDs are also granted to surfaces on the back side, with the surfaces on the back side of the reference surface S0 as a reference, similar to the reference surface S0.

C116: Base Candidate Surface Selection Unit

A base candidate surface selection unit C116 selects a base candidate surface S1 as an example of a surface which is a candidate for a development determination target, from the surfaces A1 to An having the assigned IDs.

C117: Adjacent Surface Selection Unit

When the base candidate surface S1 is selected, an adjacent surface selection unit C117 selects surfaces being in a relationship adjacent to the base candidate surface S1 as adjacent surfaces S2 to Sm, from the surfaces A1 to An having the assigned IDs. The adjacent surface selection unit C117 in the first example also selects surfaces which are adjacent through the fillet surface F, as the adjacent surfaces S2 to Sm which are adjacent to the base candidate surface S1. Therefore, for example, in FIG. 6, when the surfaces of ID "1" is selected as the base candidate surface S1, the surfaces of ID "1-1" to "1-10" are selected as the adjacent surfaces S2 to S11.

C118: Unit for Determining Adjacency Between Adjacent Surfaces

A unit C118 for determining adjacency between adjacent surfaces determines whether or not the adjacent surfaces S2 to Sm are adjacent to each other, when the adjacent surfaces S2 to Sm for the base candidate surface S1 are selected. In the first example, the unit C118 for determining adjacency between adjacent surfaces selects one surface from the adjacent surfaces S2 to Sm. Then, it is determined whether or not there is a surface adjacent to the selected surface, among the adjacent surfaces S2 to Sm. When there is a surface adjacent to the selected surface, information is given which indicates that the selected surface and the surface adjacent to the selected surface being adjacent to each other. In the same manner, with respect to each of all adjacent surfaces S2 to Sm, it is determined whether or not there is a surface adjacent to each of the adjacent surfaces S2 to Sm, among the adjacent surfaces S2 to Sm. When there is a surface adjacent to each of the all adjacent surfaces S2 to Sm, information is given which indicates the selected surface and the surface adjacent to the selected surface being adjacent to each other.

Thus, for example, in FIG. 6, when the surface of the ID "1" is selected as the base candidate surface S1 and the surfaces of the IDs "1-1" to "1-10" are selected as the adjacent surfaces S2 to S11, it is determined that there is no surface adjacent to each other, with respect to the surface of the ID "1-1" among the adjacent surfaces S2 to S11, based on the given information. Further, for the surfaces of the IDs "1-2" to "1-6", it is determined that there are surfaces adjacent to each other among the adjacent surfaces S2 to S11 and the adjacent surfaces S3 to S7 of the IDs "1-2" to "1-6" are connected. Further, for the surfaces of the IDs "1-7" to "1-10", it is determined that there are surfaces adjacent to each other among the adjacent surfaces S2 to S11 and the adjacent surfaces S8 to S11 of the IDs "1-7" to "1-10" are connected.

C119: Processed Portion Specification Unit

When the adjacent surfaces S2 to Sm are adjacent to each other, a processed portion specification unit C119 which is an example of a development determination target specification unit specifies the base candidate surface S1 and the connected adjacent surfaces S2 to Sm as the processed portions T1 to Tq which are examples of the development determination target. The processed portion specification unit C119 of the first example respectively specifies processed portions T1 to Tq for the connected adjacent surfaces S2 to Sm. In other words, a portion is specified which has a second surface adjacent to the base candidate surface S1 which is an example of a first surface, and a third surface that is adjacent to the base candidate surface S1 and the second surface. Thus, for example, in FIG. 6, when the surface having the ID "1" is the base candidate surface S1, the base candidate surface S1 is specified as the base surface T1, the adjacent surfaces having the IDs "1-2" to "1-6" are specified as adjacent surfaces T2 to T6 of the first processed portion, and the adjacent surfaces having IDs "1-7" to "1-10" are specified as the adjacent surfaces T7 to T11 of the second processed portion.

Figure 7C:
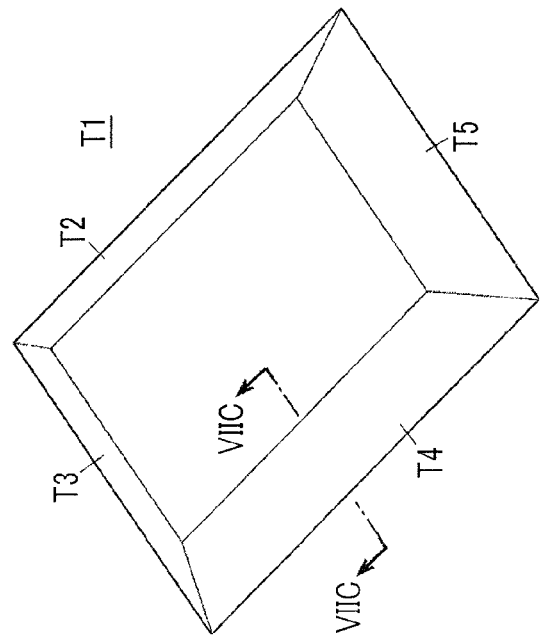
FIGS. 7A to 7D are explanatory diagrams of processed portions.
Figure 7D:
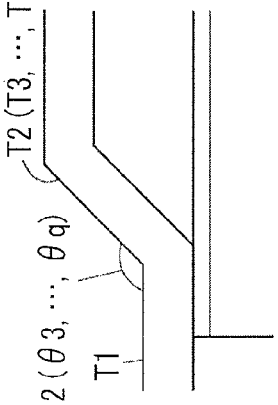
Figure 7A:
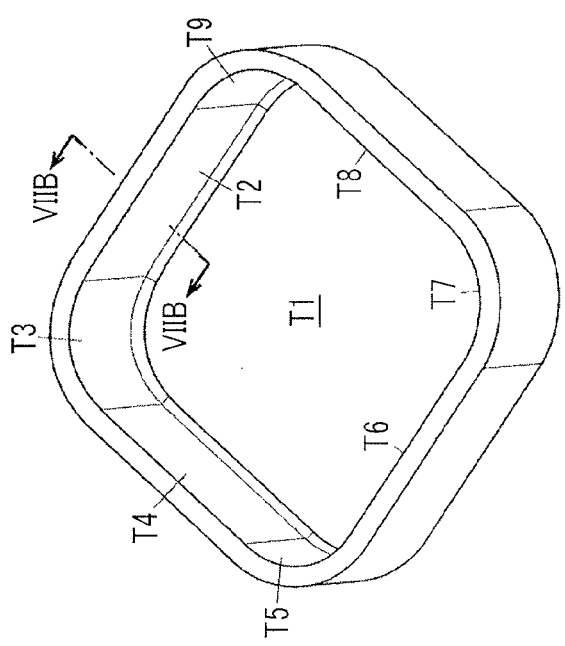
Figure 7B:
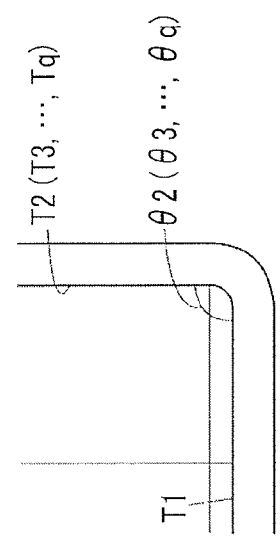

FIGS. 7A to 7D are explanatory diagrams of processed portions, FIG. 7A is a perspective view of a flange bending portion, FIG. 7B is a sectional view taken along line VIIB-VIIB in FIG. 7A, FIG. 7C is a perspective view of a throttle portion, and FIG. 7D is a sectional view taken along line VIID-VIID in FIG. 7C.

C120: Inclination Angle Calculation Unit

An inclination angle calculation unit C120 calculates angles $\theta 2$ to $\theta q$ between the base surface T1 and the adjacent surfaces T2 to Tq of the processed portion. In FIGS. 7A to 7D, the inclination angle calculation unit C120 of the first example obtains the normal line vector vN1 of the base surface T1 and the normal line vectors vN2 to vNq of the adjacent surfaces T2 to Tq of the processed portion, based on the normal line calculation unit C113. Then, angles $\theta 2$ to $\theta q$ between the base surface S1 and the adjacent surfaces T2 to Tq of the processed portion are calculated, based on the angle between the normal line vector vN1 of the base surface T1 and the normal line vectors vN2 to vNq of the adjacent surfaces T2 to Tq of the processed portion. In addition, since the known configuration in the related art such as the configuration described in, for example, JP-A-2009-119716 and JP-A-2015-5111 may be applied to the calculation of the angles $\theta 2$ to $\theta q$ between the surfaces, the detailed description thereof will be omitted.

Figure 8A:
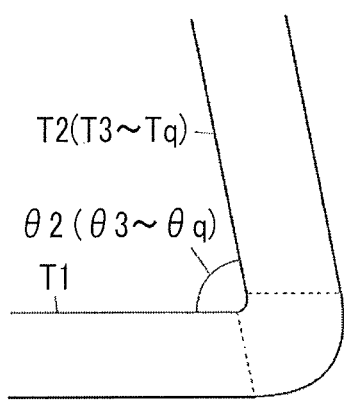
FIGS. 8A and 8B are explanatory diagrams of inclination angles.
Figure 8B:
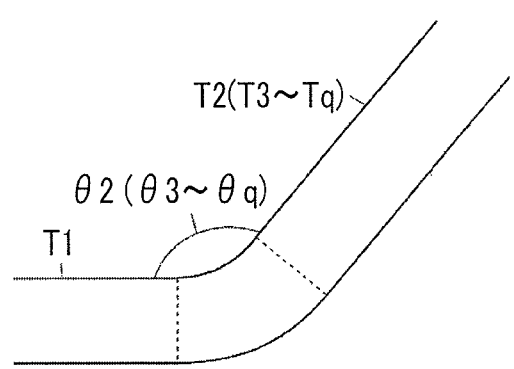

FIGS. 8A and 8B are explanatory diagrams of inclination angles, FIG. 8A is an explanatory diagram of a case where an inclination angle is 90° or less, and FIG. 8B is an explanatory diagram of a case where the inclination angle is greater than 90° and less than 180°.

C121: Development Surface Determination Unit

A development surface determination unit C121 determines whether the base surface T1 is a base surface T1$f$ of a flange which is an example of the development surface, or a base surface T1$s$ of a throttle surface which is an example of a non-development surface, for each of the adjacent surfaces T2 to T6, and T7 to T11 of the connected processed portions. The development surface determination unit C121, in FIG. 8A, when the angles $\theta 2$ to $\theta q$ between the base surface T1 and each of the adjacent surfaces T2 to Tq of the connected processed portions is 90° or less which is an example of a pre-set threshold, in other words, 0° or greater and 90° or less, the base surface T1 is determined as the base surface T1$f$ of the flange, and the adjacent surfaces T2 to Tq of the connected processed portions are determined as the flange bending portions T2$f$ to Tq$f$.

Further, in FIG. 8B, when any of the angles $\theta 2$ to $\theta q$ between the base surface T1 and each of the adjacent surfaces T2 to Tq of the processed portions is greater than 90° and less than 180°, the development surface determination unit C121 determines the base surface T1 as the base surface T1$s$ of a throttle, and determines the adjacent surfaces T2 to Tq of the connected processed portions as the throttle portions T2$s$ to Tq$s$.

Figure 9A:
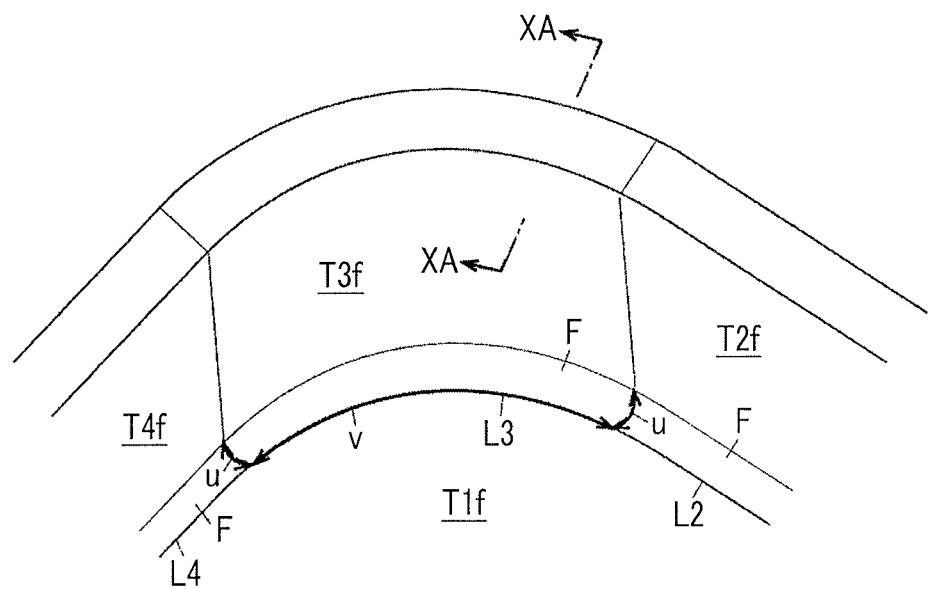
FIGS. 9A and 9B are explanatory diagrams of boundary lines of flange bending portions.
Figure 9B:
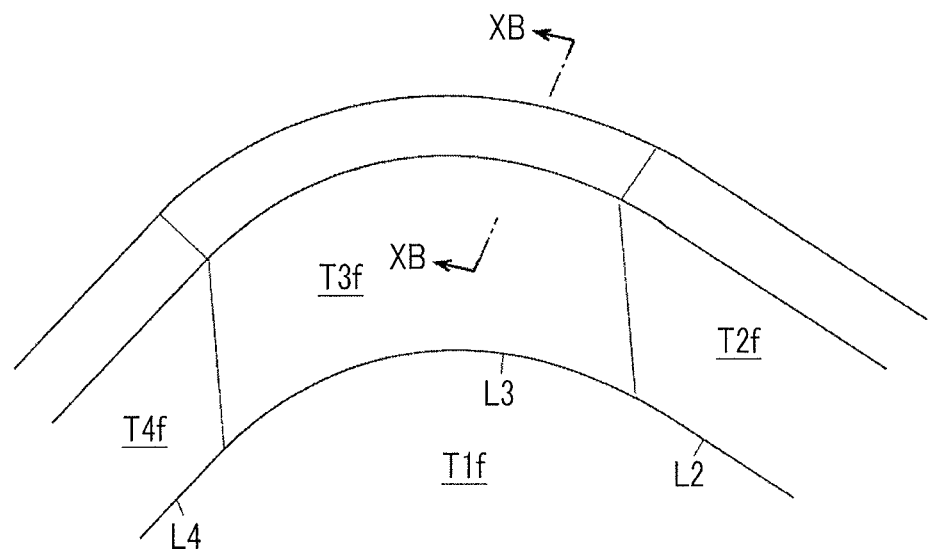

FIGS. 9A and 9B are explanatory diagrams of boundary lines of flange bending portions, FIG. 9A is an explanatory diagram of a case where the flange bending portions are connected through a fillet surface, and FIG. 9B is an explanatory diagram of a case where the flange bending portions are connected not through the fillet surface.

C131: Development View Generation Unit

A development view generation unit C131 includes units C132 to C138, and a development view along the pre-set reference surface S0 is generated with respect to the base surface T1$f$ of the flange and the flange bending portions T2$f$ to Tq$f$ which are determined by the development surface determination unit C121.

C132: Boundary Line Acquisition Unit C132 for Flange Bending Portion

The boundary line acquisition unit C132 for the flange bending portion acquires the boundary lines L2 to Lq on the flange bending portions T2f to Tqf, in the boundary line of the base surface T1f of the flange. In FIGS. 9A and 9B, when the flange bending portions T2f to Tqf are connected through the fillet surface F, the boundary line acquisition unit C132 for the flange bending portion acquires the boundary lines L2 to Lq between the fillet surface F connected to the flange bending portions T2f to Tqf and the base surface T1f of the flange. Further, when the flange bending portions T2f to Tqf are connected not through the fillet surface F, the boundary line acquisition unit C132 for the flange bending portion acquires the boundary lines L2 to Lq between the flange bending portions T2f to Tqf and the base surface T1f of the flange.

C133: Fillet Curvature Radius Acquisition Unit

When the boundary lines L2 to Lq are boundary lines of the fillet surface F, a fillet curvature radius acquisition unit C133 acquires the curvature radius R of the fillet surface F along the direction from the base surface T1f of the flange towards the flange bending portions T2f to Tqf. The fillet curvature radius acquisition unit C133 of the first example sets a u-direction and a v-direction with respect to the fillet surface F having the boundary lines L2 to Lq. At this time, one of the u-direction and the v-direction is set along the boundary lines L2 to Lq, the other is set as the direction intersecting with the boundary lines L2 to Lq. Thus, the fillet curvature radius acquisition unit C133 acquires the curvature radius of the radius along the u-direction, and the curvature radius of the radius along the v-direction. Then, the fillet curvature radius acquisition unit C133 sets the smaller curvature radii to the curvature radii R: R2 to Rq of the fillet surface F having the boundary line.

Figure 10A:
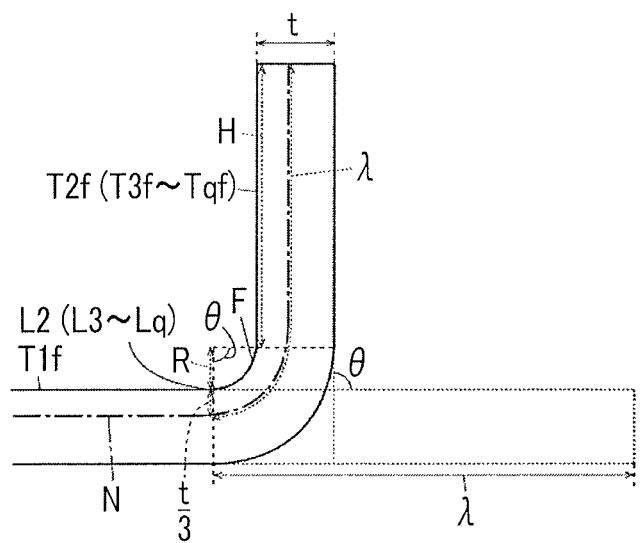
FIGS. 10A and 10B are explanatory diagrams of an offset distance.
Figure 10B:
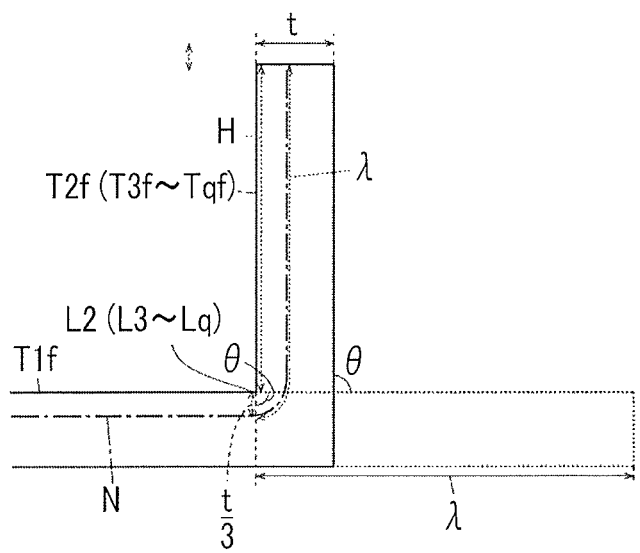

FIGS. 10A and 10B are explanatory diagrams of an offset distance, FIG. 10A is a sectional view taken along line XA-XA in FIG. 9A, and FIG. 10B is a sectional view taken along line XB-XB in FIG. 9B.

C134: Offset Distance Calculation Unit

When the flange bending portions T2f to Tqf are developed along the base surface T1f of the flange, an offset distance calculation unit C134 which is an example of the calculation unit of the development length of the flange bending portion calculates the offset distance λ which is an example of the development length of the flange bending portion.

In FIGS. 10A and 10B, the thickness of the plate metal which is a plate-like member is set as t. Further, the heights of the flange bending portions T2f to Tqf, in other words, the lengths of respective surfaces T2f to Tqf from the proximal end to the free end are set as H: H2 to Hq. Further, the curvature radii of the fillet surfaces F are set as R: R2 to Rq. Further, the angles θ between the base surface T1f of the flange and the flange bending portions T2f to Tqf are set as θ2 to θq. Here, in the first example, the offset distances λ: λ2 to λq are calculated, based on the neutral line N along the position of the depth t/3 in the thickness direction from the surface on the inner diameter side, in view of the extension or distortion in response to the bending of the plate metal.

In other words, when the flange bending portions are connected through the fillet surface F, the calculation unit C134 of the offset distance calculates the offset distance λ, based on the values t, H, R, and θ, by the following equation (1). Further, when the flange bending portions are connected not through the fillet surface F, the calculation unit C134 of the offset distance calculates the offset distance λ, based on the values t, H, θ, and R=0, by the following equation (1).

$$\lambda = H + \{2 \cdot \pi \cdot (R + t/3)\} \cdot \theta / 360° \quad \text{Equation (1)}$$

C135: Development Work Surface Selection Unit

A development work surface selection unit C135 which is an example of an outer surface specification unit selects the development work surface which is an example of the outer surface, from the surfaces A1 to An on the reference surface S0 side having assigned IDs. In the first example, a surface which is a non-work surface and has the smallest number of adjacent surfaces is selected as the development work surface, from the surfaces A1 to An on the reference surface S0 side having assigned IDs. When there are one or more objects, the surface having many pieces of ID adjacent information "-", and having the smallest number of identification number which has last been assigned is preferably selected as the development work surface. In addition, information indicating whether or not a surface is the non-work surface is given by a development unit C136 which will be described later.

Here, for example, in FIG. 6, the number of surfaces adjacent to "1" is 10. The number of surfaces adjacent to "1-1" is 2. The number of surfaces adjacent to "1-2" is 2. The number of surfaces respectively adjacent to "1-3" to "1-5" is 3. The number of surfaces adjacent to "1-6" is 2. The number of surfaces respectively adjacent to "1-7" to "1-10" is 4. The number of surfaces adjacent to "1-1-1" is 1. The surface adjacent to "1-7-1" is 4. Thus, first, "1-1-1" having the smallest number of adjacent surfaces is selected as the development work surface. If the "1-1-1" is developed, the "1-1" having the second smallest number of adjacent surfaces, which is the non-work surface, is selected as the development work surface. If the "1-1" is developed, the "1-2" having the third smallest number of adjacent surfaces, which is the non-work surface, and having a small identification number is selected as the development work surface. In the same manner, the development work surfaces are selected until the development work is completed for all of the surfaces.

Figure 11A:
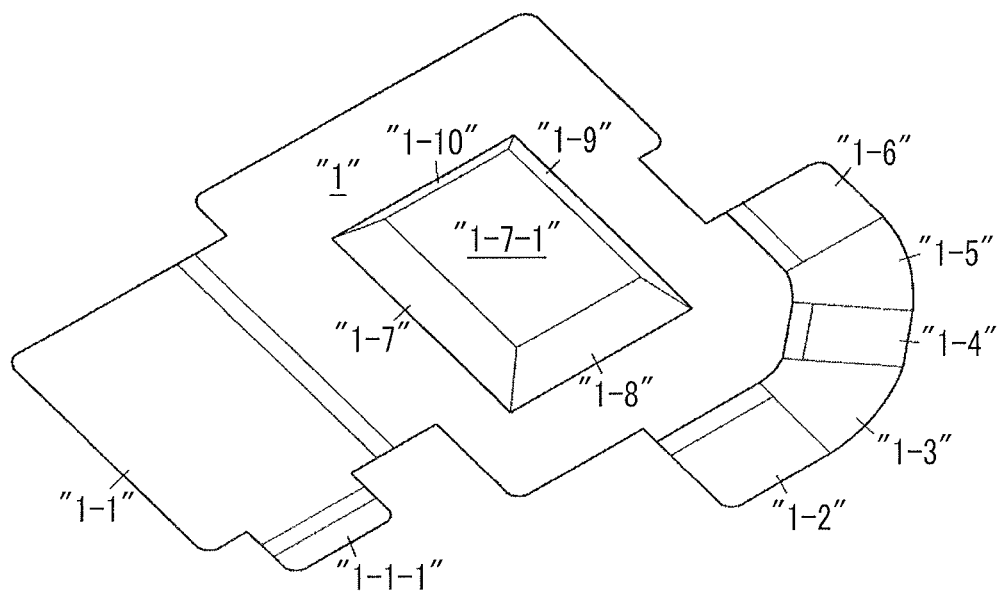
FIGS. 11A and 11B are explanatory diagrams of development data.
Figure 11B:
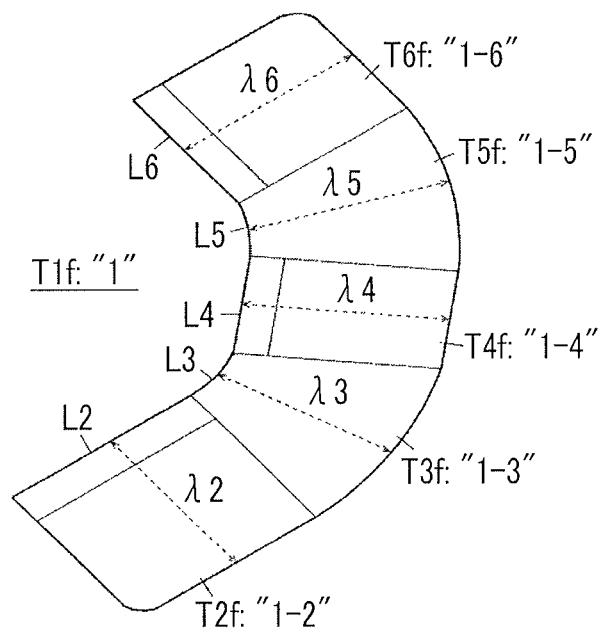

FIGS. 11A and 11B are explanatory diagrams of development data, FIG. 11A is an entire explanatory diagram, and FIG. 11B is an enlarged view of the flange bending portion.

C136: Development Unit

The development unit C136 generates development view 2 of the base surface T1f and the flange bending portions T2f to Tqf of the flange, along the pre-set reference surface S0. The development unit C136 of the first example performs a process of generating the development view for the development work surface, each time the development work surface is selected by the development work surface selection unit C135.

Specifically, if the development work surface is selected, the development unit C136 of the first example determines whether or not the development work surface is the flange bending portions T2f to Tqf. When it is determined as the flange bending portions T2f to Tqf, the respective connected flange bending portions T2f to Tqf are developed. In other words, in FIG. 11B, the development unit 136 generates a shape with respect to the base surface T1f of the flange, developing away from the respective boundary lines L2 to Lq, by the offset distance λ2 to λq, in the direction to expand the base surface T1f. Then, information indicating the completion of the development work on the flange bending portions T2f to Tqf is given.

Further, when it is determined that the development work surface is not the flange bending portions T2f to Tqf, the development unit C136 of the first example determines whether or not the back side of the development work surface is the flange bending portions T2f to Tqf. When the back side of the development work surface is determined as the flange bending portions T2f to Tqf, the connected flange bending portions T2f to Tqf are developed and have the development shape of the surface on the reference surface S0 side, in other words, the selected development work surface, based on the development shape on the back surface side of the development work surface. Then, information indicating the completion of the development work is given to the back surfaces of the respective flange bending portions T2f to Tqf, in other words, the surface on the reference surface S0 side.

Further, when it is determined that the development work surface and the back surface of the development work surface are not the flange bending portions T2f to Tqf, the development unit C136 of the first example determines whether or not the development work surface is the throttle portions T2s to Tqs. When the development work surface is determined as the throttle portions T2s to Tqs, information indicating the completion of the development process is given to the respective connected throttle portions T2s to Tqs, in other words, the throttle portions T2s to Tqs are not developed, and the shapes of the throttle portions T2s to Tqs are maintained. Thus, the throttle portions T2s to Tqs maintains the shape fixed to the base surface T1s of the throttle. Further, when it is determined that the development work surface is not the throttle portions T2s to Tqs, the development unit C136 of the first example determines whether or not the back side of the development work surface is throttle portions T2s to Tqs. When it is determined that the back side is the throttle portions T2s to Tqs, information indicating the completion of the development process is given to the back sides of the respective connected throttle portions T2s to Tqs, in other words, the surfaces on the reference surface S0 side.

Further, when it is determined that the development work surface and the back side of the development work surface are not the flange bending portions T2f to Tqf or the throttle portions T2s to Tqs, the development unit C136 of the first example develops the development work surface, along a surface which is adjacent to the development work surface and is closer to the reference surface S. However, when the entire surface adjacent to the development work surface is the throttle portion, the development work surface is not developed. Then, information indicating the completion of the development work is given to the development work surface. In addition, when it is determined that the development work surface and the back side of the development work surface are not the flange bending portions T2f to Tqf or the throttle portions T2s to Tqs, it is possible to apply the technique known in the related art such as the configuration in the related art to the technique of developing the development work surface.

Further, if the information indicating the completion of the development work is given to the development work surface, the development unit C136 of the first example performs the process of the development work on the subsequent development work surface. In the same manner, the process of the development work is repeated until the information indicating the completion of the development work is given to the entire surface.

C137: Development Propriety Determination Unit

A development propriety determination unit C137 determines whether or not the article shape may be developed, based on the development data that the development unit C136 has generated. When the developed surfaces are overlapped, the development propriety determination unit C137 of the first example determines that development is not possible, and gives an development-not-possible attribute information to the original surfaces A1 to An.

C138: Display Unit

The display unit C138 displays the development view on the display H2. The display unit C138 of the first example displays the flange bending portions T2f to Tqf and the throttle portions T2s to Tqs in different colors. Further, the display unit C138 of the first example also displays the surface for which development is not possible in a different color.

Description of Controller of License Server LSV

In FIG. 2, similar to the computer main body H1 of the client personal computer PC, the computer main body H1 of the license server LSV includes an input and output interface, a ROM, a RAM, a CPU, a clock oscillator, and the like. The license server LSV may realize various functions by executing the program stored in the hard disk, the ROM, and the like. Further, the operating system OS is stored in the hard disk of the license server LSV. Further, application programs and the like such as a design support authentication program AP1' are stored in the hard disk of the license server LSV. The design support authentication program AP1' transmits information on the license of the design supporting system S, to the client personal computer PC. Hereinafter, respective functions (control unit) of the authentication program AP1' will be described.

Authentication Program AP1'

The authentication program AP1' includes a request information reception unit C1', a license information transmission unit C2', and a request information storage unit C3'.

The request information reception unit C1' receives the request information from the client personal computer PC.

The license information transmission unit C2' transmits the license information.

The request information storage unit C3' stores the request information.

In addition, the license server LSV of the first example transmits and receives information with the client personal computer PC, and allows the use of the design supporting system S by transferring the license information based on the request information.

Description of Flowchart of First Example

Next, the processing flow of the design support program AP2 of the client personal computer PC of the first example will be described using the flowchart. In addition, with respect to the processes corresponding to the authentication programs AP1 and AP1' of the client personal computer PC and the license server LSV, the client personal computer PC transmits the request information and receives and stores the information on the license, and the license server LSV transmits and stores the request information and receives the information on the license, such that the detailed description of the flowchart will be omitted.

Figure 12:
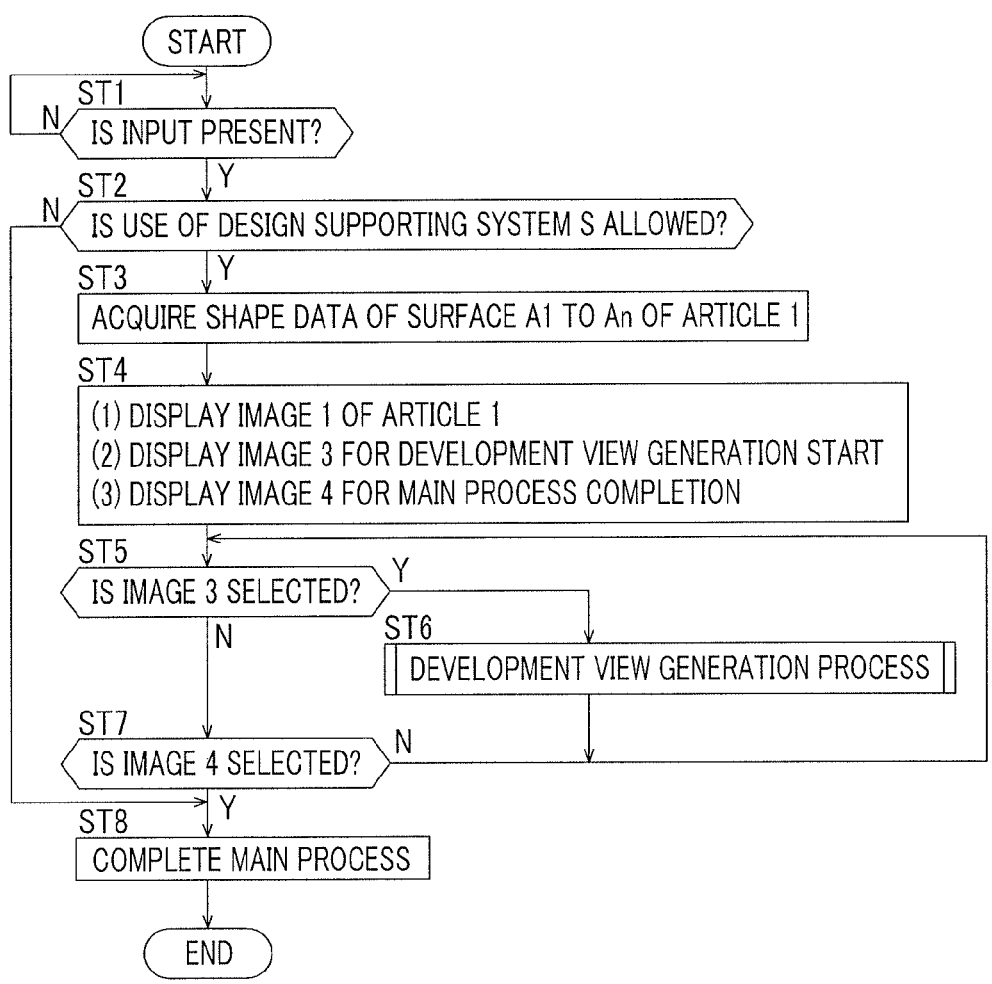
FIG. 12 is a flowchart of a main process of a design support program of the first example of the present invention.

Description of Flowchart of Main Process of Design Support Program AP2 of First Example FIG. 12 is a flowchart of a main process of a design support program of the first example of the present invention.

The process of each step (ST) of FIG. 12 is performed according to a program stored in a ROM or the like of the controller. Further, the process is performed in a multi-task in parallel with other various processes of the controller, for example, the drawing process and the like of molded products.

The flowchart illustrated in FIG. 12 is started when the design support program AP2 is launched after the client personal computer PC is powered on.

In ST1 of FIG. 12, it is determined whether or not there is an input initiated by the keyboard H3 or the mouse H4 by the user. In the case of yes (Y), the process proceeds to ST2, and in the case of no (N), ST1 is repeated.

In ST2, it is determined whether or not the use of the design supporting system S is allowed. In the case of yes (Y), the process proceeds to ST3; and in the case of no (N), the process proceeds to ST8.

In ST3, the shape data of the surface A1 to An is acquired, based on the storage information of the shape storage unit C102. Then, the process proceeds to ST4.

In ST4, the processes of the following (1) to (3) are executed. Then, the process proceeds to ST5.

(1) Display the image 1 of an article.
(2) Display the image 3 for execution start.
(3) Display the image 4 for main process completion.

In ST5, it is determined whether or not the image 3 is selected. In the case of yes (Y), the process proceeds to ST6; and in the case of no (N), the process proceeds to ST7.

In ST6, the development view generation process illustrated in the flowchart of FIG. 13, which will be described later, is executed. Then, the process returns to ST5.

In ST7, it is determined whether or not the image 4 is selected. In the case of yes (Y), the process proceeds to ST8; and in the case of no (N), the process returns to ST5.

In ST8, the main process of the design support program AP2 is completed.

Figure 13:
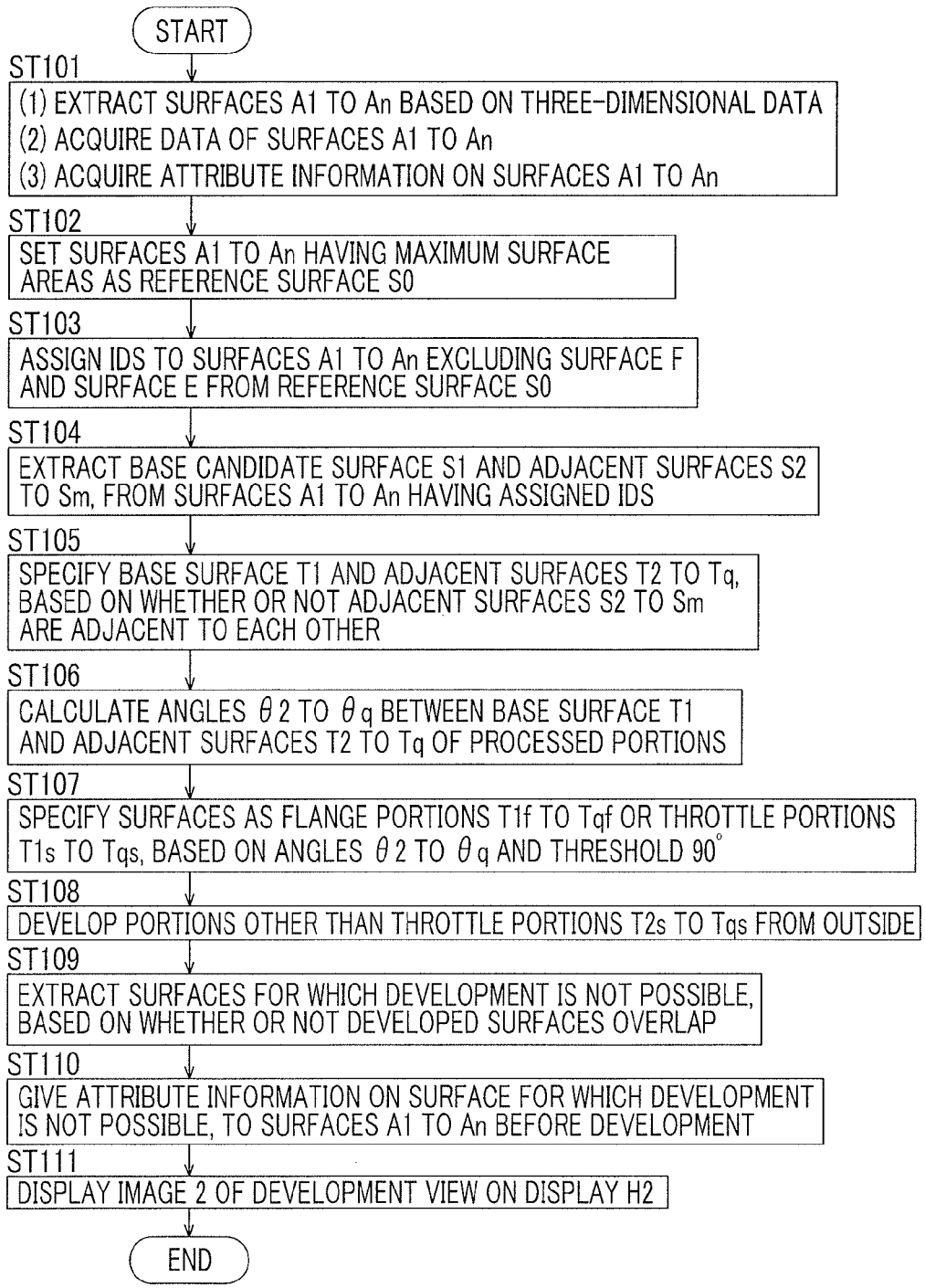
FIG. 13 is a flowchart of a development view generation process of the first example, which explains a subroutine of ST6 of FIG. 12.

Description of Flowchart of Development View Generation Process of Design Support Program AP2 of the First Example FIG. 13 is a flowchart of a development view generation process of the first example, which explains a subroutine of ST6 of FIG. 12.

In ST101 illustrated in FIG. 13, the following (1) to (3) are executed. Then, the process proceeds to ST 102.

(1) Extract surfaces A1 to An based on three-dimensional data.
(2) Acquire data of surfaces A1 to An.
(3) Acquire attribute information of the surfaces A1 to An.

In ST102, the surfaces A1 to An having the maximum surface areas B1 to Bn are set as the reference surface S0. Then, the process proceeds to ST 103.

In ST103, IDs are assigned to the surfaces A1 to An excluding the fillet surface F and the end surface E, in order from the reference surface S0. Then, the process proceeds to ST104.

In ST104, the base candidate surface S1 and the adjacent surfaces S2 to Sm adjacent to the base candidate surface S1 are extracted, from the surfaces A1 to An having the assigned IDs. Then, the process proceeds to ST105.

In ST105, the base surface T1, and the adjacent surfaces T2 to Tq of the processed portion are specified, based on whether or not the extracted adjacent surfaces S2 to Sm are adjacent to each other. Then, the process proceeds to ST106.

In ST106, the angles θ2 to θq between the base surface T1 and each of the adjacent surfaces T2 to Tq of the processed portions are calculated. Then, the process proceeds to ST107.

In ST107, surfaces are specified as the flange portions T1ƒ to Tqƒ or throttle portions T1s to Tqs, based on the angles θ2 to θq and the threshold 90°. Then, the process proceeds to ST108.

In ST108, development shapes are generated in order from the outside, for portions other than the throttle portions T2s to Tqs. Then, the process proceeds to ST109.

In ST109, surfaces for which development is not possible are extracted, based on whether or not the development shapes overlap. Then, the process proceeds to ST110.

In ST110, information indicating that the development is not possible is given as attributes to the surfaces A1 to An before development. Then, the process proceeds to ST111.

In ST111, the image 2 of the development view is displayed on the display H2. Then, the development view generation process is ended, and the process returns to ST5 of the main process.

Operation According to First Example
Function of Design Support Program AP2

In the design supporting system S of the first example with the above configuration, the design support program AP2 is executed, and the main process illustrated in FIG. 12 is executed. If an input is performed by selecting the image 2 illustrated in FIG. 3, the subroutine of the development view generation process illustrated in FIG. 13 is requested.

Figure 14A:
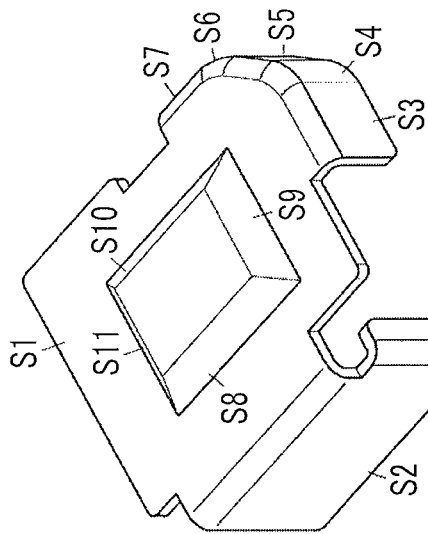
FIGS. 14A to 14D are explanatory diagrams of the operations of the development view generation process of the first example.
Figure 14C:
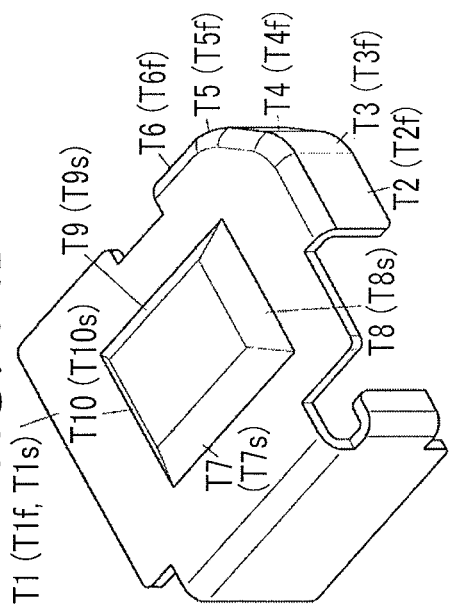
Figure 14B:
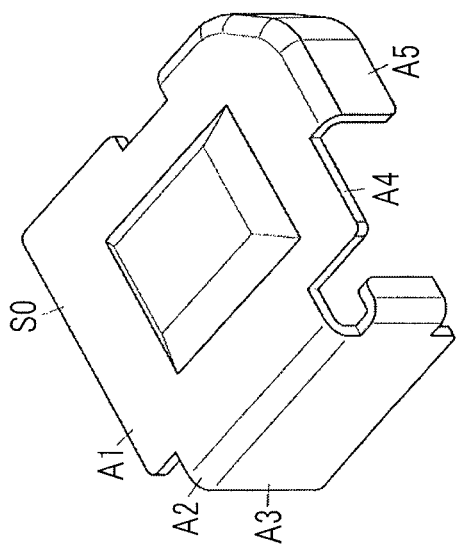
Figure 14D:
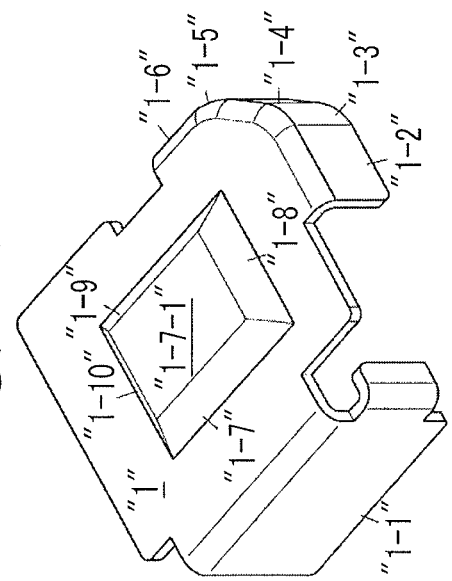

FIGS. 14A to 14D are explanatory diagrams of the operations of the development view generation process of the first example, FIG. 14A is an explanatory diagram of a three-dimensional shape of a development view generation target, FIG. 14B is an explanatory diagram of ID assignment, FIG. 14C is an explanatory diagram when processed portions are specified, and FIG. 14D is an explanatory diagram when the flange bending portion and the throttle portion are specified.

If the development view generation process is started, in the first example, surface attribute information on the surfaces A to An of the article to be developed and other surfaces is achieved. In FIGS. 14A and 14B, when information is achieved based on stored information, the surfaces A1 to An having the largest area are set as the reference surface S0, IDs are assigned to the surfaces A1 to An excluding the surface having the attributes of the fillet surface F or the end surface E, from the reference surface S0. In other words, IDs are assigned to the surfaces that are determination targets of the flange bending portion or the throttle portion.

In FIG. 14C, if IDs are assigned, with respect to the surfaces A1 to An having assigned IDs, the base candidate surface S1 is selected in order. In this case, the adjacent surfaces S2 to Sm adjacent to the base candidate surface S1 are selected, and it is determined whether or not the adjacent surfaces S2 to Sm are adjacent to each other. In FIGS. 14C and 14D, when the adjacent surfaces S2 to Sm are adjacent to each other, the adjacent surfaces S2 to Sm which are adjacent are specified as the adjacent surfaces T2 to Tq of the processed portions, and the selected base candidate surface S1 is specified as the base surface T1. In addition, when there are plural portions in which the adjacent surfaces S2 to Sm are adjacent and connected to each other, plural adjacent surfaces T2 to Tq of the processed portion are specified for the same base surface T1.

In FIG. 14D, if the base surface T1 and the adjacent surfaces T2 to Tq of the processed portions are specified, the angles θ2 to θq between the base surface T1 and each of the adjacent surfaces T2 to Tq of the processed portions are calculated. When all of the angles θ2 to θq of the adjacent surfaces T2 to Tq of the processed portions are 0° or greater and 90° or less, in the connected parts, the base surface T1 is determined as the base surface T1ƒ of the flange, and the adjacent surfaces T2 to Tq of the processed portion are determined as the flange bending portions T2ƒ to Tqƒ.

Further, when any of the angles θ2 to θq of the adjacent surfaces T2 to Tq of the processed portions is greater than 90° and less than 180°, in the connected parts, the base surface T1 is determined as the base surface T1s of the throttle, and the adjacent surfaces T2 to Tq of the processed portion are determined as the throttle portions T2s to Tqs.

Figure 15A:
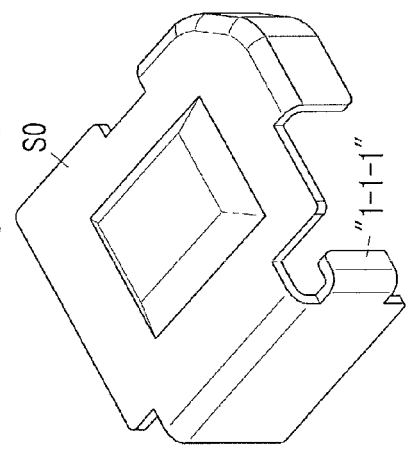
FIGS. 15A to 15D are explanatory diagrams of the operations of the development view generation process of the first example, which are successive to FIGS. 14A to 14D.
Figure 15B:
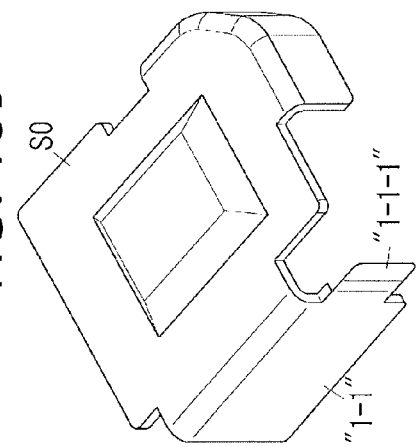
Figure 15C:
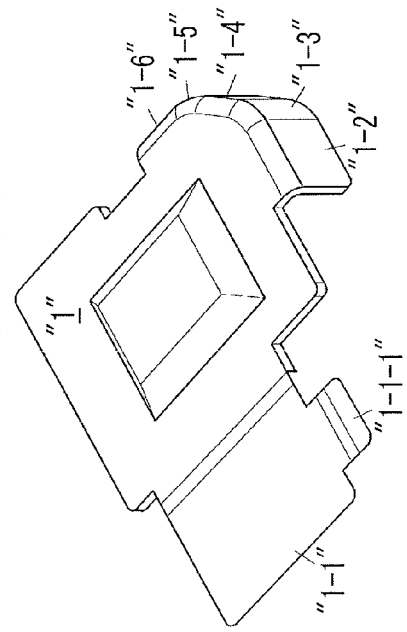
Figure 15D:
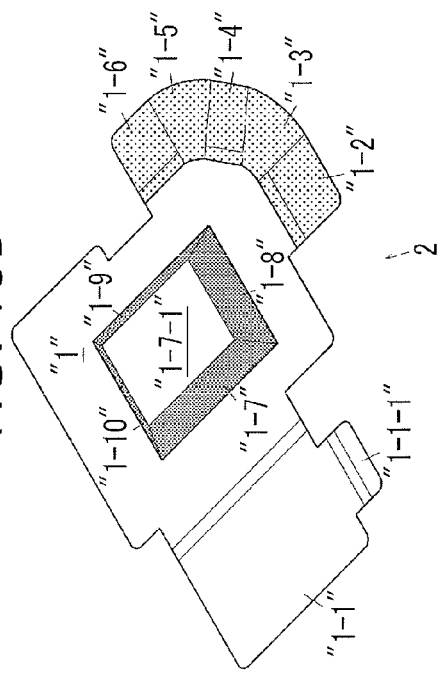

FIGS. 15A to 15D are explanatory diagrams of the operations of the development view generation process of the first example, which are successive to FIGS. 14A to 14D, FIG. 15A is an explanatory diagram of a development view generation target, FIG. 15B is an explanatory diagram of a development view in which a first surface is developed, FIG. 15C is an explanatory diagram of a development view in which a subsequent surface is developed, and FIG. 15D is an explanatory diagram of a development view in which a development work has been completed.

In FIGS. 15A to 15D, when the development view is generated, in the first example, outer surfaces are developed in order from the outer surface having a small number of adjacent surfaces. Specifically, in FIG. 15A, the surface of the ID "1-1-1" is developed. At this time, the surface of the ID "1-1-1" is developed along the surface of the ID "1-1" that is an adjacent surface and is close to the reference surface S0. If the development of the surface of the ID "1-1-1" is completed, the development work surface which becomes the next target is selected. As the next development work surface, the surface that is not yet developed and has the small number of adjacent surfaces is selected. In FIGS. 15A to 15D, the surface of the ID "1-1" is selected. Then, as illustrated in FIG. 15C, the surface of the ID "1-1" is developed along the surface of the ID "1" which is the reference surface S0 that is adjacent thereto. At this time, the surface of the ID "1-1-1" that is connected to the surface of the ID "1-1" is also developed.

If the surface of the ID "1-1" is developed, the surface of the ID "1-2" is selected as the next development work surface. The back surface of the surface of the ID "1-2" is specified as the flange bending portion Tf. Thus, as illustrated in FIG. 15D, the surfaces of the ID "1-2" to ID "1-6" are developed, based on the offset distance λ, corresponding to the flange bending portion Tf of the surface of the ID "1-2". Then, the surface of the next ID that is not yet developed and has the small number of adjacent surfaces is selected. In FIGS. 15A to 15D, the surface of the ID "1-7" is selected as the next development work surface. The surface of the ID "1-7" is specified as the throttle portion Ts. Thus, the surfaces of the ID "1-7" to ID "1-10" are not developed corresponding to the throttle portion Ts of surface of the ID "1-7". Then, the surface of the ID "1-7-1" is selected as the next development target surface. All of the surfaces adjacent to the surface of the ID "1-7-1" are throttle portion Ts. Thus, the surface of the ID "1-7-1" is not developed. Thus, a development view 2 is generated along the reference surface S0, in other words, the surface of the ID "1".

In the first example, if a development view is generated, it is determined whether or not the developed surfaces overlap. When the developed surfaces overlap each other, the surfaces overlapping each other are determined to be development-not-possible. If there is a surface that is determined to be development-not-possible, development-not-possible attribute information is given to the original surfaces A1 to An before the development. If the development possibility determination is completed, the generated development view is displayed on the display H2 in a different color. In the first example, in a state where the throttle portion Ts is processed, the development view is displayed.

If the development view is displayed, the development view generation process is ended, and the process returns to the main process.

Here, in the configuration in the related art, whether the surface is the flange bending portion or the throttle portion has not been determined. Therefore, even if the throttle portion and the flange bending portion are intended to be developed from the three-dimensional data, based on the configuration in the related art, both the throttle portion and the flange bending portion are not developed or both are developed.

When both the throttle portion and the flange bending portion are not developed, it is necessary for the operator to recognize and develop the throttle portion and the flange bending portion from the three-dimensional image of the three-dimensional data for generating the development view. Thus, the development view generation work is likely to be complicated.

Meanwhile, even if both the throttle portion and the flange bending portion are developed, since whether the surface is the flange bending portion or the throttle portion has not been determined, it is difficult to distinguish the processed portion of the throttle portion and the processed portion of the flange bending portion on a development view. Thus, there is a risk of mistaking the processed portion of the throttle portion and the processed portion of the flange bending portion. Therefore, there is a risk of performing a bending process on the part to be subjected to a press process, and thus the parts may be broken due to the attributes of materials.

In contrast, in the first example, whether the surface is the throttle portion Ts or the flange bending portion Tf is determined based on the three-dimensional data. Then, the development view of three-dimensional data is generated by the throttle portion Ts not being developed and the flange bending portion Tf being developed. Thus, in the first example, the development view is created in a state where the throttle portion Ts and the flange bending portion Tf are specified, and the development view is more easily generated according to a processing method from the three-dimensional data, as compared to the related art. Therefore, in the first example, it becomes possible to easily prevent a part to be subjected to a press process and a part to be subjected to a flange bending process from being mistaken.

Figure 16:
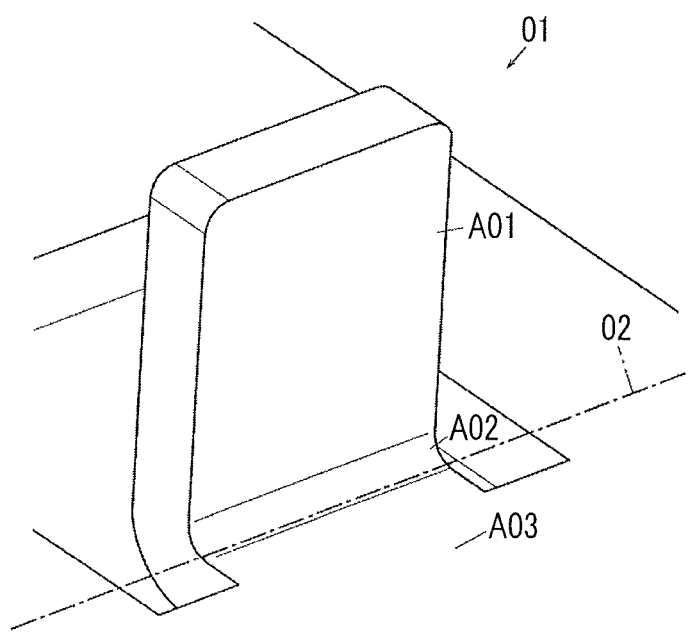
FIG. 16 is an explanatory diagram for comparison.

FIG. 16 is an explanatory diagram for comparison.

Originally, in the related art, with respect to a surface that is round, the surface is determined that development is not possible, and a cylindrical shape and the like are not developed. Thus, in the related art, throttle portions, flange portions, and the like which is round as illustrated in FIGS. 7A and 7C are not developed.

Further, the related art has a configuration in which even if the shape that is not round is developed, as illustrated in FIG. 16, surfaces A01 to A03 and the like of a three-dimensional shape of a cut-and-raised portion 01 are developed, with an axis 02 that is a curvature center, as a center, or a curved surface is development by being sub-divided and subjected to plane approximation. Thus, even if the flange bending portion and the like that are not round are developed based on the configuration in the related art, the developed shape is likely to be different from the actually required plate metal shape.

In contrast, in the first example, when the flange bending portion Tf is developed, the development shape is generated based on the boundary line L and the offset distance λ of the base surface T1f. Thus, in the first example, as compared to the related art, the development shape of the flange bending portion Tf is accurately generated. Further, in the first example, the development shape of the round flange bending portion Tf which has been not possible in the related art is also generated.

Modification Examples

Hitherto, although the examples of the present invention have been described in detail, the present invention is not limited to the examples, and it is possible to make various changes within the scope of the present invention described in the claims. Modification examples (H01) to (H03) of the present invention are illustrated below.

(H01) Although the above-described example illustrates the configuration in which the development surface determination unit C121 determines and specifies whether the surface is the flange bending portion or the throttle portion, based on 90° which is an example of the threshold, the threshold is not limited to 90°. Here, the inclination angle of the throttle portion relative to the base surface is likely to be set as 135° to 180° on an actual plate metal. Thus, a configuration is possible in which the threshold is set as 135° and whether the surface is the flange bending portion or the throttle portion is determined based on whether the inclination angle is 135° or more. In other words, an arbitrary angle is set as the threshold depending on the specification, and whether the surface is the flange bending portion or the throttle portion is determined.

(H02) Although the above-described example illustrates the configuration in which, setting both the surfaces on the same side as the reference surface S0 and the surfaces on the back side of the reference surface S0, with respect to the thickness direction as targets, when the angles θ2 to θq of the adjacent surfaces T2 to Tq relative to the base station T1 are 0° or greater and 90° or less, the development surface determination unit C121 specifies the surfaces as the flange bending portion, and when the angles are greater than 90° or less than 180, the development surface determination unit C121 specifies the surfaces as the throttle portion, the present invention is not limited thereto. For example, a configuration is possible in which, with only the surfaces on the same side as the reference surface S0 as targets, when the angles θ2 to θq of the adjacent surfaces T2 to Tq relative to the base station T1 are 0° or greater and 90° or less, the surfaces are specified as the flange bending portion; when the angles θ2 to θq are greater than 90° and less than 270°, the surfaces are specified as the throttle portion; and when the angles θ2 to θq are 270° or less and are less than 360°, the surfaces are specified as the flange bending portion. In other words, a configuration is possible in which the shape is determined for only surfaces placed on one side with respect to the reference surface S0.

(H03) Although the above-described example illustrates the configuration in which when the throttle portion and the flange bending portion are specified, in the state where the flange bending portion is developed, the flange bending portion is displayed in a different color, the present invention is not limited thereto. For example, when the throttle portion Ts and the flange bending portion Tf are specified based on the three-dimensional data, the throttle portion and the flange bending portion may be displayed in a different color on the three-dimensional image 1 before development. In other words, it is also possible to end only determination as to whether the surface is the throttle portion or the flange bending portion.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A development view generation system comprising:
   a storage unit configured to store information about a three-dimensional shape of an article;
   a development surface determination unit configured to, in response to there being a second surface adjacent to a first surface, the first surface being a determination target, and there being a third surface adjacent to the first surface and the second surface, among surfaces forming the three-dimensional shape of the article, if an angle between the first surface and the second surface is a pre-set threshold or less, and an angle between the first surface and the third surface is the threshold or less, determine the first surface as a development surface, and if any one of the respective angles is greater than the threshold, determine the first surface as a non-development surface; and
   a development view generation unit configured to generate a development view along a pre-set reference surface, for a surface which is determined as a development surface by the development surface determination unit.

2. The development view generation system of claim 1, wherein the pre-set threshold includes an angle set based on a specification of the first surface.

3. The development view generation system of claim 1, wherein the development view generation unit is configured to bend the development surface but not bend the non-development surface so the non-development surface is maintained unchanged in shape.

4. A non-transitory computer readable medium storing a program causing a computer to function as:
   a storage unit that stores information on a three-dimensional shape of an article;
   a development surface determination unit in which when there is a second surface adjacent to a first surface, the first surface being a determination target, and there is a third surface adjacent to the first surface and the second surface, among surfaces forming the three-dimensional shape of the article, if an angle between the first surface and the second surface is a pre-set threshold or less, and an angle between the first surface and the third surface is the threshold or less, the development surface determination unit determines the first surface as a development surface, and if any one of the respective angles is greater than the threshold, the development surface determination unit determines the first surface as a non-development surface; and
   a development view generation unit that generates a development view along a pre-set reference surface, for a surface which is determined as a development surface by the development surface determination unit.

5. The non-transitory computer readable medium of claim 4, wherein the pre-set threshold includes an angle set based on a specification of the first surface.

6. The non-transitory computer readable medium of claim 4, wherein the development view generation unit is configured to bend the development surface but not bend the non-development surface so the non-development surface is maintained unchanged in shape.

* * * * *